Patented May 10, 1927.

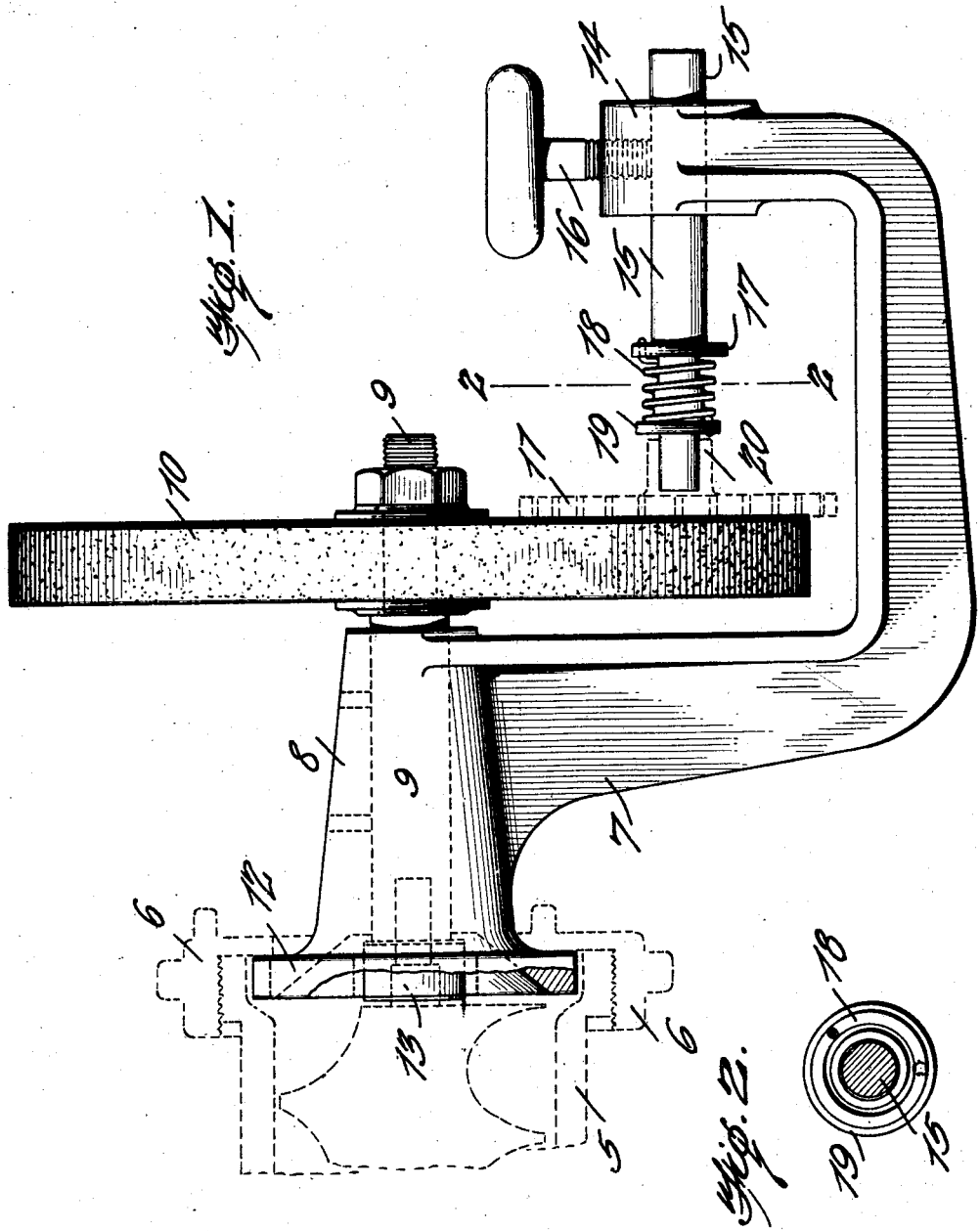

1,628,031

UNITED STATES PATENT OFFICE.

EMIL G. CHERMAK AND FRANK S. PRITZL, OF MANITOWOC, WISCONSIN.

SHARPENER FOR GRINDER KNIVES.

Application filed October 28, 1926. Serial No. 144,836.

This invention relates to sharpeners for knives or apertured disks of meat grinders, and has for an object the provision of novel means whereby a sharpening instrumentality may be applied to a meat grinder in order that said sharpener will be driven through the power employed for operating the grinder; and it is furthermore an object of the invention to provide a sharpener of the character indicated which may be anchored to the meat grinder in the same way as the grinding knife or disk is held in the meat grinder.

It is a further object of this invention to provide a sharpener for knives or apertured disks of meat grinders, effective to dress or abrade the side of the said knife or disk uniformly, the said device having novel means for holding the instrumentalities in operative relation while the shapening device is being driven.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a sharpening device embodying the invention applied to a conventional type of meat grinder; and Figure 2 illustrates a sectional view on the line 2—2 of Fig. 1.

In these drawings, 5 denotes the casing of a conventional type of grinder and 6 the ring nut therefor employed for holding the knife or disk in operative relation to the feeding means for delivering the material to the knife or disk.

It is the purpose of the inventors that the sharpening mechanism shall be substituted for the knife of a meat grinder and that it shall be held in operative relation to the feed worm shaft in order that it will take motion from the said shaft and operate an abrading wheel for sharpening the knife or disk of the grinder.

In carrying the invention into practice, a bracket 7 is provided with a bearing 8 in which a shaft 9 is rotatable and the said shaft is provided with an abrading wheel 10, such as a grindstone or emery wheel, which will prove efficient to dress the surface of an apertured disk 11, such as is employed in meat grinders.

The bearing 8 has an external flange 12 at its inner end and this flange is of a diameter and size to fit in the seat of a meat grinder usually occupied by a disk such as 11, and the bearing is held in place by a ring nut, such as 6. The inner end of the shaft 9 is provided with a recess whose walls conform to the configuration of the end of the shaft 13 of the feed worm of the grinder, and it is the purpose of the inventors that as the feed worm is rotated, rotary motion will be communicated therefrom to the shaft 9 in order that the abrading wheel may be rotated.

The outer end of the bracket has an angularly disposed and apertured boss 14, through which a rod or shaft 15 extends and in which it is adjustable. It is held at different positions of adjustment by a set screw 16 threaded in the boss and adapted to bear against the said rod. The inner end of the rod constitutes a support on which the disk 11 may rotate in contact with the abrading wheel, and it is the purpose of the inventors that the said disk 11 shall be forced into engagement with the wheel and be maintained in such engagement while the sharpening action is taking place. To the end just stated, a stationary flange 17 is provided on the rod 15 and it constitutes an anchorage and abutment for a spring 18 that encircles the shaft. The opposite end of the spring is connected to or abuts a follower 19 which is loose on the rod 15 and which is urged into engagement with the hub 20 of the disk 11, thus causing the disk to be held against the abrading wheel while it is rotated.

The relation of parts is such that as the abrading wheel is rotated, the disk also rotates on the rod and thus the side of the disk being dressed is uniformly treated in order that the best results may be attained.

We claim:

1. In a sharpener for grinder knives, a bearing having a flange adapted to be clamped on a grinder, a shaft rotatable in the bearing and having connection with the shaft of a feed worm of a grinder, an abrading wheel on the outer end of the shaft, a bracket formed as a part of the bearing, said bracket having an angularly disposed apertured boss, a rod adjustable therein, the inner end of the said rod being in proximity to the abrading wheel and adapted to rotatably support a grinding disk, and means for urging the disk into engagement with the abrading wheel.

2. In a sharpener for grinder knives, a bearing having a flange adapted to be clamped on a grinder, a shaft rotatable in the bearing and having connection with the shaft of a feed worm of a grinder, an abrading wheel on the outer end of the shaft, a bracket formed as a part of the bearing, said bracket having an angularly disposed apertured boss, a rod adjustable therein, the inner end of the said rod being in proximity to the abrading wheel and adapted to rotatably support a grinding disk, a stationary abutment on the rod, a follower loosely applied to the rod, and operative to hold a grinding disk in engagement with the abrading wheel, and a spring interposed between the abutment and the follower.

3. In a sharpener for grinder knives, a bearing, means for securing it to a grinder, a shaft rotatable in the bearing and having connection with the shaft of a feed worm of a grinder, an abrading wheel on the outer end of the shaft, a bracket suspended from the bearing, said bracket having an angularly disposed apertured boss, a rod adjustable therein, the inner end of the said rod being in proximity to the abrading wheel and adapted to rotatably support a grinding disk, a stationary abutment on the rod, a follower loosely applied to the rod and operative to hold a grinding disk in engagement with the abrading wheel, and a spring interposed between the abutment and the follower.

4. In a sharpener for grinder knives, a bearing, means for securing it to a grinder, a shaft rotatable in the bearing and having connection with the shaft of a feed worm of a grinder, an abrading wheel on the outer end of the shaft, a bracket suspended from the bearing, said bracket having an angularly disposed apertured boss, a rod adjustable therein, the inner end of the said rod being in proximity to the abrading wheel and adapted to rotatably support a grinding disk, and yieldable means for urging the disk toward the wheel.

EMIL G. CHERMAK.
FRANK S. PRITZL.